Oct. 8, 1935. W. S. WEEKS 2,016,660
APPARATUS FOR MEASURING RATE OF COOLING
Filed Dec. 28, 1931
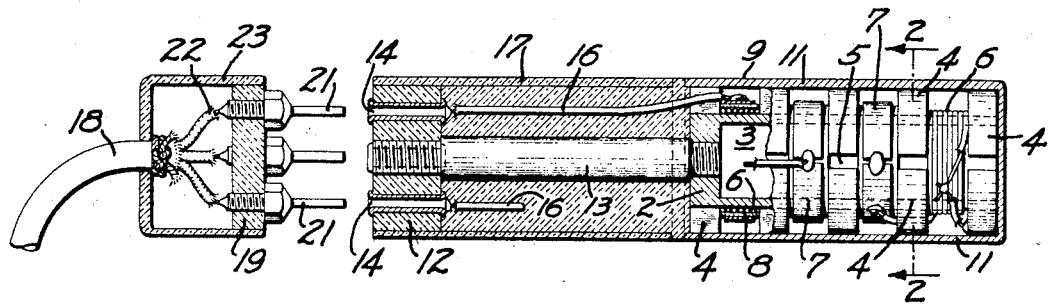
Fig. 1
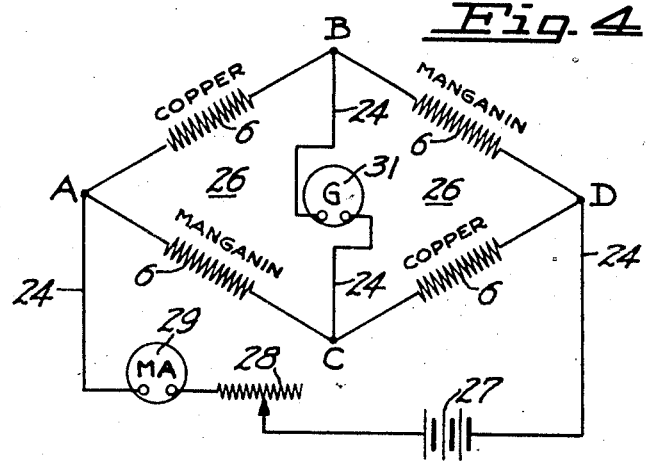
Fig. 2
Fig. 4
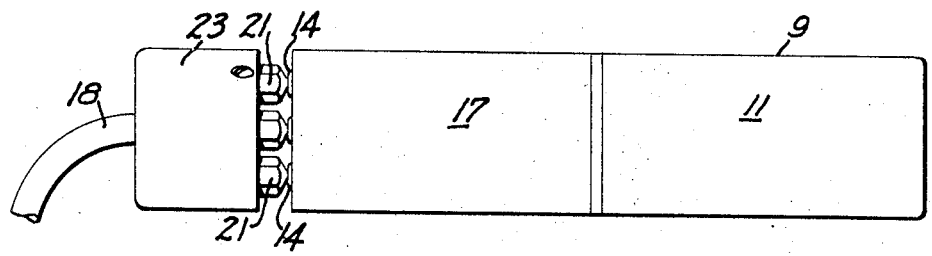
Fig. 3
INVENTOR.
WALTER S. WEEKS
BY Charles S. Evans
HIS ATTORNEYS.

Patented Oct. 8, 1935

2,016,660

UNITED STATES PATENT OFFICE 2,016,660

APPARATUS FOR MEASURING RATE OF COOLING

Walter S. Weeks, Berkeley, Calif.

Application December 28, 1931, Serial No. 583,475

5 Claims. (Cl. 73—32)

My invention relates to apparatus including a coolometer for measuring the cooling power of an environment.

It is among the objects of my invention to provide apparatus by means of which the cooling power of an environment on a solid body maintained at constant temperature may be determined.

Another object of my invention is to provide apparatus of the character described which is highly sensitive.

Another object of my invention is to provide apparatus which is accurate in its measurements; the elements upon which the accuracy depends being fixed within the coolometer and constant in value after an adjustment of the instrument has once been made.

Further objects of my invention include the provision of a coolometer which may be used as an anemometer, and which may be operated either as a reflecting or as a black body for the study of radiation.

Still further objects of my invention are to provide a coolometer of the character described which is rigid and compact, and which is waterproof so that it may be operated either wet or dry.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side view, partly in section and partly in elevation, showing the coolometer embodying my invention; and Figure 2 is a cross-section of the same taken in a plane indicated by the line 2—2 of Figure 1.

Figure 3 is a side elevational view showing the coolometer of my invention assembled and ready for operation.

Figure 4 is a diagrammatic view showing the arrangement and hook-up of the apparatus embodying my invention; the coolometer being represented by the heating coils only, for purposes of clarity.

The measurement of rate of cooling or the cooling power of an environment has attracted the attention of scientists for many years. Of particular interest has been the determination of the cooling power of an environment on a solid body maintained at constant temperature, because of the important bearing it has in conjunction with problems confronting physiologists, ventilating engineers, and those who employ labor in hot atmospheres. In the past, however, no means have been devised for accurately and precisely measuring cooling power of a solid body, the surface of which is maintained at constant temperature. The broad object of my invention is to provide such means.

In terms of broad inclusion, the apparatus for measuring rate of cooling embodying my invention comprises a cooling surface, and an electric circuit including a heating element having a resistance which varies with temperature; the element being arranged adjacent the cooling surface, and means being provided to give a free path for heat flow from the heating element to the surface so that a negligible temperature gradient exists between the same. An electric current is impressed on the circuit, and means are provided for varying the flow of current in the circuit. Means are also provided for indicating a predetermined temperature of the heating element, and means are provided for measuring the current flow in the circuit.

In the preferred form of my invention a plurality of heating elements are provided adjacent the cooling surface and are connected in the circuit to form a Wheatstone bridge, and the resistances of the elements are adjusted so that the bridge balances at the predetermined temperature; the adjustments being such that the resistance of each heating element is substantially the same at the predetermined temperature. Means are provided for indicating the balance of the bridge, which therefore provides the means for indicating the predetermined value of temperature of the heating elements.

By this arrangement the heating coils, which are thermally linked with the cooling surface for maintaining that surface at a constant predetermined temperature, also constitute an electrical thermometer operating on the null principle to hold the desired temperature. The current input with a balanced bridge gives the rate of cooling, when properly combined with the constants involved. The cooling surface and heating elements are preferably embodied in a rigid, compact and waterproof instrument, which instrument comprises the coolometer.

Since the entire electric circuit upon which the accuracy of the apparatus depends is fixed within the instrument; the factors upon which the accuracy of measurement depends are constant in value after an adjustment of the instrument has once been made. Nothing depends upon the resistance of the various external leads or other variables which change with changing conditions of operation. The cooling surface of the instrument may either be reflecting or black. With the reflecting surface the instrument may be used as an anemometer, and when the instrument is operated first as a reflecting and then as a black body, it serves for purposes of determining radiation. Since the instrument is waterproof it can be operated dry, or covered with a wet wick.

In greater detail, and referring particularly to Figures 1 to 3, the coolometer in the apparatus embodying my invention comprises a core 2 of heat conducting material. A metal, such as copper, possesses the desired heat-conducting properties and is preferably employed in making the core. For purposes of design and for convenience in handling, the core 2 is preferably cylindrical in shape, and is preferably hollowed out by a cylindrical recess 3.

A plurality of spaced annular flanges 4 are formed on the core, and a plurality of heating elements or coils 6 are wound on the core between the flanges and are suitably insulated from the core. These coils are connected together to form the arms of a Wheatstone bridge, as hereinafter described in detail. Suitable slots 5 are provided in the flanges 4 for passing the various leads connecting the coils 6, and copper bands 7 positioned to encircle the coils are preferably provided to which to solder the connections. Layers 8 of insulating material, such as mica, are also preferably provided between the buss-bar bands 7 and the coils.

A cooling surface 9 is provided adjacent the heating coils 6. This cooling surface is preferably formed by a thin cup-shaped shell 11 slidably fitted over the core 2 and contacting with the flanges 4; the shell being of heat-conducting material, such as copper. The cooling surface 9 is thus thermally linked with the heating coils 6, since the shell 11, flanges 4 and core 2 provide a free and ample path for heat flow from the coils to the surface. By this construction a negligible temperature gradient exists between the heating coils and cooling surface.

A terminal block 12 of insulating material, such as hard rubber, is mounted on the core 2. The block is preferably cylindrical in shape with a diameter substantially equal to the flanged core, and is preferably held spaced from and in axial alignment with the core by a spindle 13 of suitable insulating material, such as bakelite. Any suitable means may be employed for securing the spindle to the core and terminal block.

A plurality of socket terminals 14 are provided in the block 12, and suitable leads 16 are provided connecting the terminals with the junctions in the Wheatstone bridge arrangement of the heating coils 6, as hereinafter described in detail. A sleeve 17, preferably having a diameter substantially equal to that of the shell 11, is mounted on the terminal block 12 for enclosing the leads 16. The sleeve extends toward the core 2 and its covering shell 11, but is spaced therefrom, and is of an insulating material, such as bakelite. The space between the sleeve 17 and the spindle 13 and the space separating the core and shell from the sleeve is filled with a waterproof heat-insulating material, such as beeswax. This filling is preferably made by temporarily placing a suitable band about the assembled instrument to close the opening between the sleeve 17 and shell 11, and by pouring the melted wax through one of the hollow socket terminals 14.

The terminal plug preferably used in conjunction with the coolometer for making connections with the conductor cable 18 is also shown in Figures 1 and 3. This plug preferably comprises a base 19 carrying a plurality of terminal lugs 21 adapted for engagement in the terminal sockets 14. The several conductors 22 of the cable 18 are connected to the terminal lugs 21, and a protective cap 23 is provided for the plug and is suitably secured to the base 19 thereof.

The preferred arrangement and hook-up of the several devices making up the apparatus embodying my invention is shown diagrammatically in Figure 4. For purposes of clarity, only the resistance coils or heating elements 6 of the coolometer illustrated in Figure 1 are shown in this view. The heating coils 6, preferably four in number, are connected to form the arms of a Wheatstone bridge 26 with junctions at A, B, C and D. A pair of alternate coils in the bridge are of metal having a resistance which varies with temperature; the metal preferably having a positive temperature coefficient of resistance, such as copper. The other pair of coils are of a metal having a negligible or substantially zero temperature coefficient of resistance, such as manganin. This arrangement is clearly shown in Figure 4.

The four leads 24 connecting with the junctions A, B, C and D of the bridge 26 include the conductors 22 making up the cable 18 and the subsequent connections through the terminals 14 and 21 and leads 16 shown in Figure 1. A pair of the leads 24, which connect with the junctions A and D of the bridge, form a branch of the external circuit and preferably include a battery 27, adjustable rheostat 28, and milliammeter 29, connected in series. The battery 27 or other suitable source of E. M. F. provides the electric current which is impressed on the bridge, and the rheostat 28 provides means for varying the current input to the bridge, while the milliammeter 29 provides means for measuring the current input.

The other pair of leads 24, which connect with the junctions B and C of the bridge, form another branch of the external circuit and include a suitable current measuring device, such as the galvanometer 31. With this arrangement the current divides through the arms of the bridge in the usual manner, and, if the resistances in the arms have the proper magnitude the bridge will balance and no current will flow through the galvanometer circuit, as is well known. This condition of balance is, of course, indicated by no deflection of the galvanometer 31.

Since the coolometer is to operate at a predetermined temperature, the lengths of the wires making up the heating coils 6 are so apportioned that when the desired temperature is reached the resistances of the several arms of the bridge bear the following relation:

$$\frac{AB}{BD} = \frac{AC}{CD}$$

With the resistances in this relation the bridge will balance and the galvanometer show no deflection at the predetermined or operating temperature. At the operating temperature the resistance of each of the coils is substantially the same, so that the amount of heat generated by each coil is substantally equal.

The adjustment of the bridge in my instrument is preferably made at the time the instrument is fabricated, and the resistance relation between the coils fixed by the several soldered connections. By this arrangement an adjustment for a given operating temperature becomes permanent after once made. If desirable, slidable means may be incorporated in the instrument for varying the resistances in the bridge to adapt the instrument for operation at a different temperature, and without having to break the soldered connections in the instrument. In the preferred form of my instrument the end coils of the bridge are preferably connected together by grounding the outer ends of the coils to the core 2. This eliminates an extra lead wire.

In the operation of the instrument advantage is taken of the fact that a pair of the coils 6 in the bridge are of a material whose resistance varies with the temperature, such as the coils of copper whose resistance increases with temperature. When the surface 9 is cooled the temperature of the heating coils is lowered, which cooling decreases the resistance of the copper. Since the manganin has a negligible temperature coefficient, the resistance of these coils is not affected. Decreased resistance in the copper coils however throws the bridge off balance, and is indicated by a deflection of the galvanometer. In order to compensate for the effect of cooling and to bring the bridge back into a condition of balance the current input to the bridge is increased.

Thus, in the operation of the apparatus, the coolometer is placed in an environment whose cooling power is to be measured, and the rheostat 28 adjusted until the galvanometer 31 shows no deflection. The current input to the balanced bridge is then read on the milliammeter 29. Since the resistance of the bridge is known, the heat input per second can be calculated, and this divided by the area of the cooling surface gives the rate of cooling per unit area. For example, I have found that, with the instrument operating at a temperature of 37° centigrade or 98.6° Fahrenheit, a cooling rate of 18 millicalories per square centimeter per second requires 1.74 amperes at 2.5 volts, while a cooling rate of 1 millicalorie per square centimeter per second requires 0.41 amperes at that voltage.

By means of a suitable galvanometer, such as one calibrated so that one scale division reads 2 micro-amperes, the temperature of the instrument can be held constant to 0.006° centigrade when the cooling rate is 1 millicalorie per square centimeter per second, and to 0.002° centigrade when the rate is 18 millicalories per square centimeter per second. By using a milliammeter for current measurement, cooling power can be measured within 0.052 millicalories per square centimeter per second when the cooling rate is 18, and within 0.013 millicalories per square centimeter per second when the cooling rate is 1.

The accurate measurements obtained by my apparatus are due largely to the fact that the entire electric circuit upon which the accuracy depends is fixed within the coolometer. Nothing depends upon the resistance of the various leads or other variables which are subject to change in changing conditions of operation. The entire current is thus utilized in heating the instrument. That the instrument is rapid in action is evidenced by the fact that a mere wave of the hand will throw the galvanometer needle off center.

For the measurement of radiation two shells may be used, one having a reflecting surface and the other having a black surface. The difference between the cooling powers measured with the reflector and the black body is the net radiation received or given out. In practice I prefer to use one shell, preferably silver coated to provide a reflecting surface. When a black body is desired this is conveniently secured by temporarily coating the reflecting surface with lamp black. For use as an anemometer the reflector shell is employed, because the film coefficient of conduction is the factor which varies with velocity and consequently radiation exchange must be eliminated.

The coolometer can be operated dry, or it may be covered with a wet wick, as the instrument is waterproof. The apparatus is convenient for use in practice, because the coolometer may be placed any desired distance from the operator. Furthermore, the apparatus may be made recording by providing suitable mechanism for changing the resistance 28 when the needle of the galvanometer 31 leaves the zero point, and by using a recording device in the ammeter 29 to read cooling power.

In conclusion it is pointed out that the apparatus embodying my invention provides precision means for measuring the cooling power of an environment on a solid body maintained at constant temperature; the means including a coolometer having a cooling surface and associated heating coils which latter also constitute an electrical thermometer operating on the null principle to hold the desired temperature. Thus, the current input when the desired temperature is reached gives the rate of cooling, when properly combined with the constants of the instrument. The instrument is adapted for use as an anemometer, and can be operated as a reflecting or a black body for the study of radiation. The coolometer can be placed at a distance from the operator, and can be operated either wet or dry. Furthermore, the apparatus of my invention is readily adapted for automatic operation by the inclusion of suitable controlling and recording devices.

I claim:

1. As an article of manufacture, a coolometer comprising a core of heat conducting material, spaced flanges formed on said core, a plurality of electrical heating coils wound on the core, a terminal block mounted on and insulated from said core, terminals on said block, leads connecting the terminals with said coils, and a shell of heat conducting material fitted over the core and contacting with said flanges.

2. As an article of manufacture, a coolometer comprising a core of heat conducting material, spaced flanges formed on said core, a plurality of electrical heating coils wound on the core, a shell of heat conducting material fitted over the core and contacting with said flanges, a terminal block, a spindle of insulating material rigidly connecting the block with said core, terminals on the block, leads connecting the terminals with said coils, a sleeve mounted on the block for enclosing said leads, the sleeve extending toward the core and its covering shell but spaced therefrom, and a waterproof heat insulating material within said sleeve and in the space separating the core and shell from the sleeve.

3. As an article of manufacture, a coolometer comprising a metallic core, spaced metallic flanges formed on said core, a plurality of electrical heating coils wound on and electrically insulated from the core, a metallic shell fitted over the core and contacting with said flanges, a terminal block, a spindle of insulating material rigidly connecting the block with said core, terminals on the block, leads connecting the terminals with said coil, a sleeve mounted on the block for enclosing said leads, the sleeve extending toward the core and its covering shell but spaced therefrom, and beeswax within the sleeve and in the space separating the core and shell from the sleeve.

4. A coolometer comprising a heat conducting core, a Wheatstone bridge having its arms wound on said core in spaced coils, a heat conducting flange on the core between each of said coils, and a heat conducting shell extending over all of the coils and contacting with said flanges.

5. A coolometer comprising a heat conducting core, a Wheatstone bridge having its arms wound on said core in spaced coils, a pair of said arms being of a material having a substantially zero coefficient of resistance and another pair being of a material having a positive coefficient of resistance, a heat conducting flange on the core between each of said coils, and a heat conducting shell extending over all of the coils and contacting with said flanges.

WALTER S. WEEKS.